United States Patent [19]
Hanis

[11] 3,983,699
[45] Oct. 5, 1976

[54] HYDRAULIC ENGINE

[75] Inventor: Jozsef Hanis, Raytown, Mo.

[73] Assignee: The Raymond Lee Organization, Inc., New York, N.Y. ; a part interest

[22] Filed: Oct. 20, 1975

[21] Appl. No.: 623,760

[52] U.S. Cl. ............................ 60/325; 60/595; 417/380; 417/392
[51] Int. Cl.² ...................................... F04B 17/00
[58] Field of Search ............. 60/325, 595; 417/380, 417/392, 364

[56] References Cited
UNITED STATES PATENTS

| | | | |
|---|---|---|---|
| 3,119,230 | 1/1964 | Kosoff | 60/595 |
| 3,610,214 | 10/1971 | Braun | 417/380 |

*Primary Examiner*—Allen M. Ostrager
*Attorney, Agent, or Firm*—Daniel Jay Tick

[57] ABSTRACT

An oil pressure chamber is coupled to the input of a turbine for driving the turbine with hydraulic fluid under pressure. A lower cylinder has a piston movably mounted therein for movement in axial directions. The output end of the lower cylinder is coupled to the oil pressure chamber. An upper cylinder has a piston movably mounted therein for movement in axial directions and coupled to the piston of the lower cylinder for movement therewith. A hydraulic fluid supply is coupled to the output end of the lower cylinder for supplying hydraulic fluid to the lower cylinder. A fuel and air mixture supply is coupled to the output end of the upper cylinder for supplying a fuel and air mixture to the upper cylinder. A coupling device couples the output end of the upper cylinder to the input end of the lower cylinder whereby movement of the piston from the input end to output end in the upper cylinder compresses the fuel and air mixture and supplies it to the input end of the lower cylinder. A spark device in the input end of the lower cylinder explodes the fuel and air mixture in the lower cylinder thereby moving the piston thereof from the input end to the output end to compress the hydraulic fluid in the output end thereof and supply it to the oil pressure chamber and thence to the turbine to drive the turbine.

3 Claims, 1 Drawing Figure

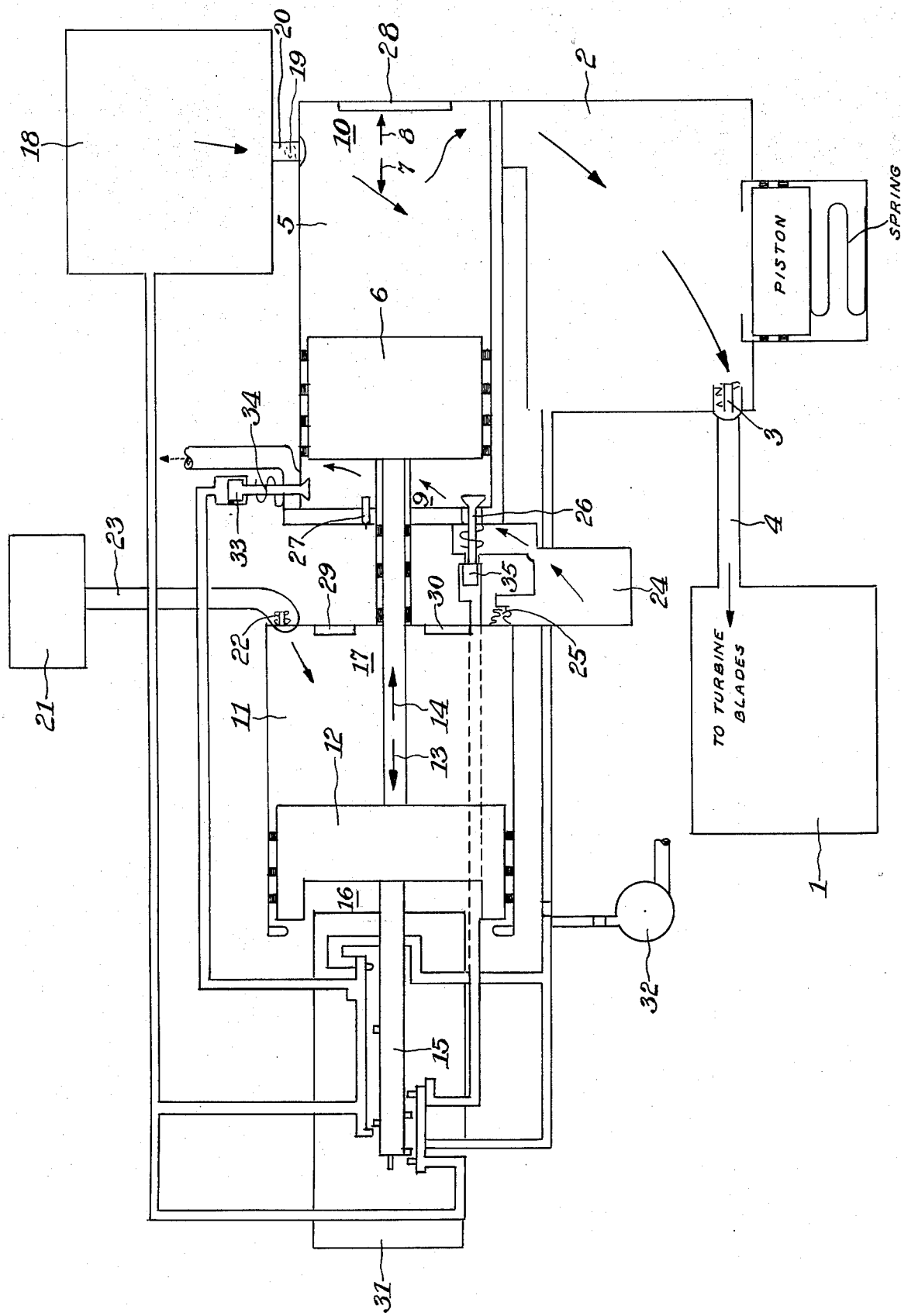

HYDRAULIC ENGINE

Description of the Invention:

The present invention relates to a hydraulic engine.

Objects of the invention are to provide a hydraulic engine which functions efficiently, effectively and reliably for any suitable desired purpose such as, for example, powering an automotive vehicle.

In order that the invention may be readily carried into effect, it will now be described with reference to the accompanying drawing, wherein the single FIGURE is a schematic diagram of an embodiment of the hydraulic engine of the invention.

The hydraulic engine of the invention comprises a turbine 1 having an input to the turbine blades.

An oil pressure chamber 2 is coupled to the input of the turbine 1 via an outlet valve 3 and a duct 4 for driving the turbine with hydraulic fluid under pressure.

A lower cylinder 5 has a piston 6 movably mounted therein for movement in axial directions, indicated by arrows 7 and 8. The lower cylinder 5 has an input end 9 and an output end 10.

An upper cylinder 11 has a piston 12 movably mounted therein for movement in axial directions, indicated by arrows 13 and 14. The piston 12 is coupled to the piston 6 of the lower cylinder 5 for movement therewith. Thus, both pistons 6 and 12 are mounted on a common piston shaft 15. The upper cylinder 11 has an input end 16 and an output end 17.

A hydraulic fluid supply or fluid reserve tank 18 is coupled to the output end 10 of the lower cylinder 5 via an outlet valve 19 and a duct 20 for supplying hydraulic fluid to the lower cylinder.

A fuel and air mixture supply such as, for example, a carburetor 21, is coupled to the output end 17 of the upper cylinder 11 via an outlet valve 22 and a duct 23 for supplying a fuel and air mixture to the upper cylinder.

A coupling arrangement, comprising a fuel and air mixture pressure chamber 24, a valve 25 and a valve 26, couples the output end 17 of the upper cylinder 11 to the input end 9 of the lower cylinder 5. Thus, movement of the piston 12 from the input end 16 to the output end 17 in the upper cylinder compresses the fuel and air mixture and supplies it to the input end 9 of the lower cylinder 5.

A spark plug 27 is provided in the input end 9 of the lower cylinder 5 for exploding the fuel and air mixture in the lower cylinder thereby moving the piston 6 from the input end to the output end 10 of the lower cylinder. This compresses the hydraulic fluid in the output end 10 of the lower cylinder 5 and supplies it to the oil pressure chamber 2 and thence to the turbine 1 to drive said turbine.

Electromagnets 28, and 29 and 30 are provided at the output ends 10 and 17 of the lower and upper cylinders 5 and 11, respectively, for starting the operation of the engine by attracting the pistons 6 and 12 to the output ends of the cylinders at the start of the engine.

A solenoid 31 is provided at the input end 16 of the upper cylinder 11 for drawing the pistons 6 and 12 back to the input ends 9 and 16 of the cylinders 5 and 11 after each compression stroke.

The engine is started by closing a starter switch which energizes the electromagnets 28, and 29 and 30 so that they attract the pistons 6 and 12 to the output ends 10 and 17 of the cylinders 5 and 11. When the piston 12 reaches the output end 17 of the cylinder 11, the solenoid 31 is energized and attracts the pistons 6 and 12 back to the input end 16 of said cylinder.

The coil of the ignition system sends an electric current to the spark plugs via the distributor of the engine to produce the explosion in the lower cylinder 5. The upper cylinder compresses the fuel and air mixture simultaneously with the compression of the hydraulic fluid in the lower cylinder 5. The piston 6 applies high pressure and expels the oil into the oil pressure chamber 2, where it is pressurized before being supplied to the turbine 1.

The speed of the hydraulic engine, when used in an automotive vehicle, is controlled by an accelerator which is coupled to a rheostat or variable resistor, which in turn controls the flow of current through the solenoid 31 and thereby controls the speed of the engine. The electromagnets 28, 29 and 30 are used only to start the engine.

An electric oil pump 32 pumps the hydraulic fluid to compress it to a predetermined pressure for the required operation of the valves.

When the pistons 6 and 12 move to the output ends of the cylinders 5 and 11, after the explosion in the cylinder 5, a cam on the piston shaft 15 moves a lever to a predetermined position which permits the pressurized hydraulic fluid to flow from the oil pressure chamber 2 to a small piston 33 wich operates the exhaust valve 34. When the piston 6 returns to a predetermined position, after the compression stroke, a fixed cam moves the lever to a closed position so that the hydraulic fluid flows away from the small piston 33 and a spring closes the exhaust valve 34.

When the pistons 6 and 12 move toward the input ends 9 and 16 of the cylinders 5 and 11, before they reach their limits of travel, the cam of the piston shaft 15 activates an intake lever. Pressurized hydraulic fluid then flows to a small piston 35 and opens the intake valve 26 to supply the compressed fuel and air mixture to the lower cylinder 5. When the piston 6 reaches the limit of its travel at the input end 9 of the cylinder 5, a cam on the piston shaft 15 moves the lever and permits the hydraulic fluid to drain from the small piston 35. The spring of the intake valve 26 then closes said intake valve.

After the engine has started and enough pressure has built up in the oil pressure chamber 2, a pressure sensitive oil pressure switch deenergizes the oil pump 32. The oil pressure chamber 2 continuously maintains a high pressure for operating the valves and for faster pickup. The pressurized hydraulic fluid is fed directly to the pumps or turbines which are provided on the axles of the automotive vehicle.

The cam of the exhaust valve 34 is movable, so that if the piston does not reach the bottom position it will still open the exhaust valve. The cam of the exhaust valve is spring-loaded and functions in the manner of an advance unit. That is, the faster the cam moves, the later the exhaust valve opens and the slower the cam moves, the sooner the valve opens.

While the invention has been described by means of a specific example and in a specific embodiment, I do not wish to be limited thereto, for obvious modifications will occur to those skilled in the art without departing from the spirit and scope of the invention.

I claim:

1. A hydraulic engine, comprising a turbine having an input;
   an oil pressure chamber coupled to the input of the turbine for driving the turbine with hydraulic fluid under pressure;
   a lower cylinder having a piston movably mounted therein for movement in axial directions, said cylinder having an input end and an output end, the output end of the lower cylinder being coupled to the oil pressure chamber;
   an upper cylinder having a piston movably mounted therein for movement in axial directions and coupled to the piston of the lower cylinder for movement therewith; said cylinder having an input end and an output end;
   hydraulic fluid supply means coupled to the output end of the lower cylinder for supplying hydraulic fluid to said lower cylinder;
   fuel and air mixture supply means coupled to the output end of the upper cylinder for supplying a fuel and air mixture to said upper cylinder;
   coupling means coupling the output end of the upper cylinder to the input end of the lower cylinder whereby movement of the piston from the input end to output end in the upper cylinder compresses the fuel and air mixture and supplies it to the input end of the lower cylinder; and
   spark means in the input end of the lower cylinder for exploding the fuel and air mixture in the lower cylinder thereby moving the piston thereof from the input end to the output end to compress the hydraulic fluid in the output end thereof and supply it to the oil pressure chamber and thence to the turbine to drive said turbine.

2. A hydraulic engine as claimd in claim 1, further comprising electromagnet means at the output ends of the upper and lower cylinders for starting the operation of the engine by attracting the pistons to the output ends of the cylinders at the start of the engine.

3. A hydraulic engine as claimed in claim 1, further comprising solenoid means at the input end of the upper cylinder for drawing the pistons back to the input ends of the cylinder after each compression stroke.

* * * * *